United States Patent
Suzaki et al.

(10) Patent No.: US 11,305,821 B1
(45) Date of Patent: Apr. 19, 2022

(54) VEHICLE BODY FRONT STRUCTURE

(71) Applicant: HONDA MOTOR CO., LTD., Tokyo (JP)

(72) Inventors: Akinari Suzaki, Tokyo (JP); Atsushi Minochi, Tokyo (JP); Tomoyuki Kato, Wako (JP); Shinichi Todaka, Tokyo (JP); Hirofumi Takemoto, Tokyo (JP); Yusuke Chigira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/194,405

(22) Filed: Mar. 8, 2021

(51) Int. Cl.
| | |
|---|---|
| *B62D 25/08* | (2006.01) |
| *B62D 25/12* | (2006.01) |
| *F21S 41/26* | (2018.01) |
| *F21S 41/29* | (2018.01) |
| *F21S 41/63* | (2018.01) |

(52) U.S. Cl.
CPC ........... *B62D 25/081* (2013.01); *B62D 25/12* (2013.01); *F21S 41/26* (2018.01); *F21S 41/29* (2018.01); *F21S 41/63* (2018.01)

(58) Field of Classification Search
CPC ....... B62D 25/081; B62D 25/12; F21S 41/26; F21S 41/29; F21S 41/63; B62J 17/02; B62J 17/04; B60J 1/02
See application file for complete search history.

(56) References Cited

U.S. PATENT DOCUMENTS

| | | | | |
|---|---|---|---|---|
| 3,539,799 A | * | 11/1970 | Dangauthier | F21S 41/29 362/328 |
| 6,000,814 A | * | 12/1999 | Nestell | F21S 41/29 362/267 |
| 6,190,030 B1 | * | 2/2001 | Chase | B60Q 1/0458 362/549 |
| 7,322,639 B2 | * | 1/2008 | Takata | B60Q 1/0491 296/187.03 |
| 9,701,343 B2 | * | 7/2017 | Sakai | B62D 21/152 |
| 2008/0259628 A1 | * | 10/2008 | Lin | F21S 41/28 362/520 |
| 2012/0126574 A1 | * | 5/2012 | Komiya | B60Q 1/0017 296/181.5 |
| 2014/0334176 A1 | * | 11/2014 | Maeshima | B62D 25/02 362/520 |
| 2021/0031678 A1 | * | 2/2021 | Glickman | B60Q 1/503 |
| 2021/0053642 A1 | * | 2/2021 | Kuroba | B62J 50/16 |
| 2021/0070389 A1 | * | 3/2021 | Harada | F21S 43/239 |

FOREIGN PATENT DOCUMENTS

JP       H06-127434 A       5/1994

* cited by examiner

*Primary Examiner* — Zheng Song
(74) *Attorney, Agent, or Firm* — Rankin, Hill & Clark LLP

(57) ABSTRACT

A front vehicle body structure includes a windshield and a lighting body unit provided beside and along an end surface of the windshield in a vehicle width direction. The lighting body unit has a lighting body and an outer lens that is disposed along the end surface of the windshield and transmits light from the lighting body. A gap is provided between the windshield and the outer lens. The outer lens has a front surface portion facing a front side of a vehicle, and a side surface portion extending toward a rear side of the vehicle from an end of the front surface portion on the windshield side. A chamfered portion is provided at an outside corner portion formed by the front surface portion and the side surface portion.

7 Claims, 4 Drawing Sheets

PART III

| DEPTH (mm) | FREQUENCY (Hz) |
|---|---|
| 150 | 46.2 |
| 75 | 92.6 |
| 37.5 | 185 |
| 18.8 | 369.4 |
| 9.4 | 738.8 |
| 4.7 | 1477.5 |
| 2.4 | 2893.5 |

VEHICLE BODY FRONT STRUCTURE

BACKGROUND OF THE INVENTION

1. Field of the Invention

The present invention relates to a front vehicle body structure.

2. Description of the Related Art

Front vehicle body structures have heretofore been proposed in which a front light unit is provided on each of left and right end portions of the cabin side of a windshield, and a side turn signal lamp unit is attached to a triangular corner portion at the base of the front side of a glass frame on each front door (e.g., Japanese Patent Application Publication No. H6-127434).

SUMMARY OF THE INVENTION

In a case of using a conventional front vehicle body structure design as above with front light units disposed outside the cabin, air flowing along the surface of the windshield toward left and right end portions of the cabin side vibrates at edges of the front light units and generates wind noise. Thus, there is still room for further improvement.

An object of the present invention is to provide a front vehicle body structure capable of reducing wind noise.

A front vehicle body structure of the present invention includes: a windshield; and a lighting body unit provided beside and along an end surface of the windshield in a vehicle width direction. The lighting body unit has a lighting body and an outer lens that is disposed along the end surface of the windshield and transmits light from the lighting body. A gap is provided between the windshield and the outer lens, the outer lens has a front surface portion facing a front side of a vehicle and a side surface portion extending toward a rear side of the vehicle from an end of the front surface portion on the windshield side, and a chamfered portion is provided at an outside corner portion formed by the front surface portion and the side surface portion.

According to the present invention, a front vehicle body structure capable of reducing wind noise is provided.

DETAILED DESCRIPTION OF THE EMBODIMENTS

An embodiment of the present invention will be described below with reference to the drawings as appropriate. Identical constituent components are denoted by the same reference sign and overlapping description is omitted. When a direction is described, it is basically described based on the front-rear direction, the left-right direction, or the up-down direction in the view of the driver, unless otherwise noted. Also, "vehicle width direction" means the same as "left-right direction".

A configuration of a front vehicle body structure in this embodiment will be described.

Figure 1:
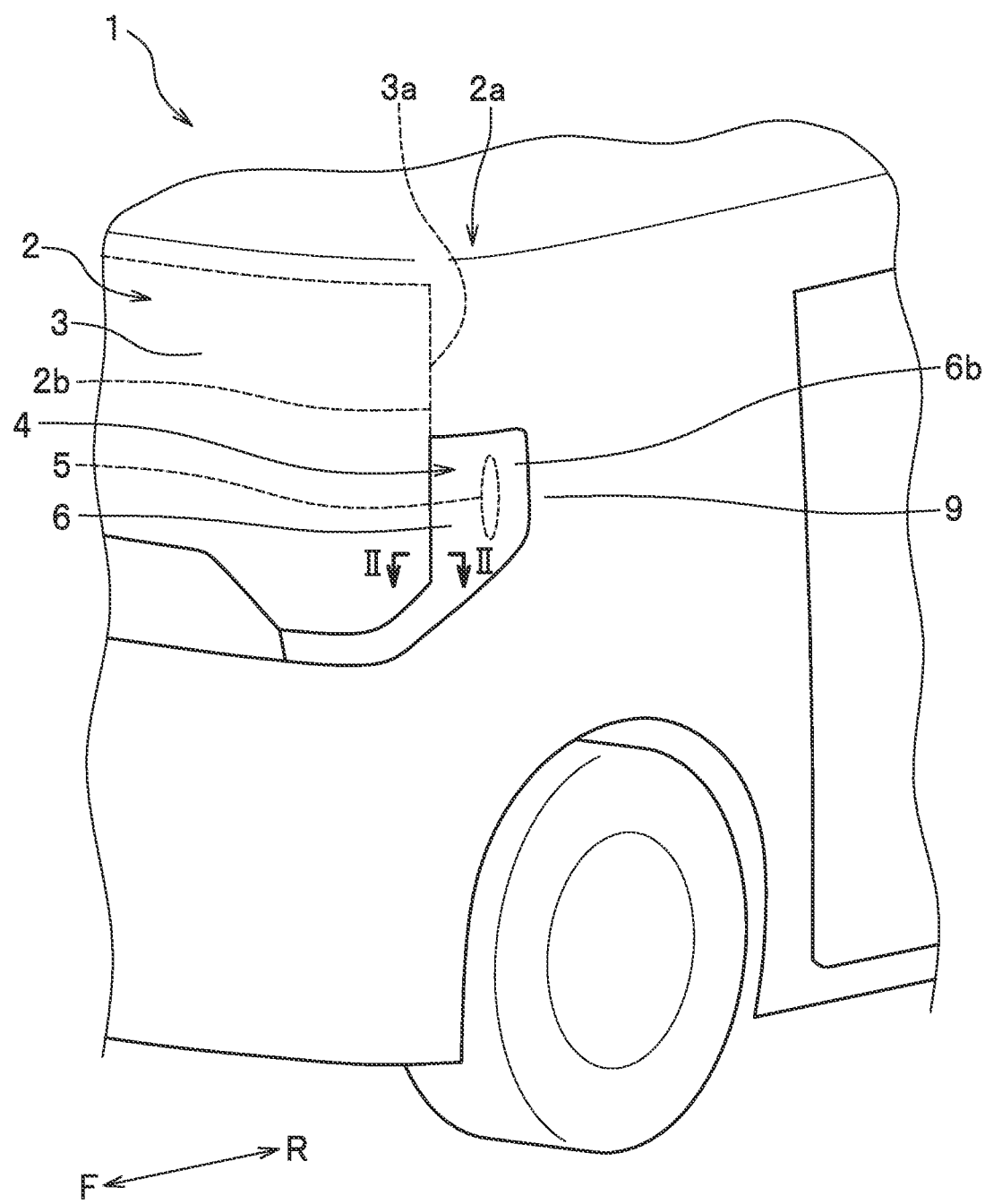
FIG. 1 is a perspective view of a front vehicle body structure in an embodiment of the present invention, explaining a configuration of a front vehicle body.

As illustrated in FIG. 1, a front part 2 of a vehicle body 1 includes a windshield 3 standing substantially vertically and a pair of left and right lighting body units 4 and 4.

The windshield 3 is substantially rectangular in a front view, and is curved and inclined such that its end surfaces 3a and 3a in the vehicle width direction (see FIG. 2) face the rear side of the vehicle.

Each lighting body unit 4 is disposed adjacent to an outer side of the windshield 3 in the vehicle width direction. Also, each lighting body unit 4 is disposed at a corner portion 2a of the vehicle body 1 so as to extend from the front surface to a side surface of the vehicle body 1. Further, the upper end of each lighting body unit 4 is disposed at a position at the middle on the windshield 3 in the up-down direction. Furthermore, the lower end of each lighting body unit 4 is bent and extended along the lower end of the windshield 3.

In the embodiment, the left and right lighting body units 4 and 4 are configured to be bilaterally symmetrical to each other. Thus, in the following, the lighting body unit 4 provided at the left corner portion 2a will be described, and description of the lighting body unit 4 provided at the right corner portion 2a will be omitted since its configuration is substantially the same.

The lighting body unit 4 has a lighting body 5 that includes a light emitter such as an LED, and a transparent outer lens 6 that is provided beside and along the end surface 3a of the windshield 3 and transmits light from the lighting body 5.

Figure 2:
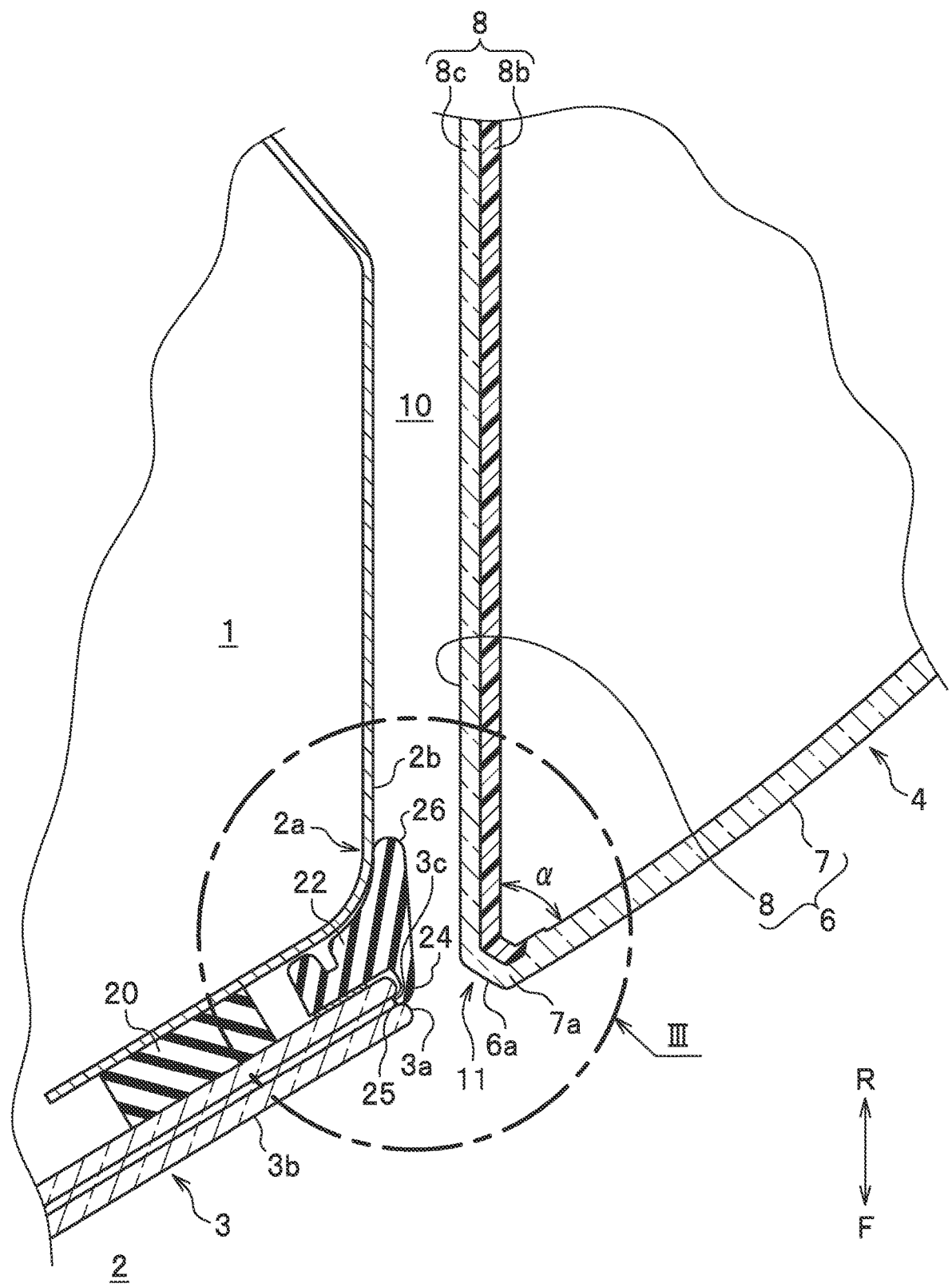
FIG. 2 is a cross-sectional view of the front vehicle body structure in the embodiment at a position along the line II-II in FIG. 1, explaining a configuration of a main part.

As illustrated in FIG. 2, a gap 10 is provided between the windshield 3 and the outer lens 6. The gap 10 is provided along the up-down direction such that it has a substantially constant dimension W in the vehicle width direction.

Figure 3:
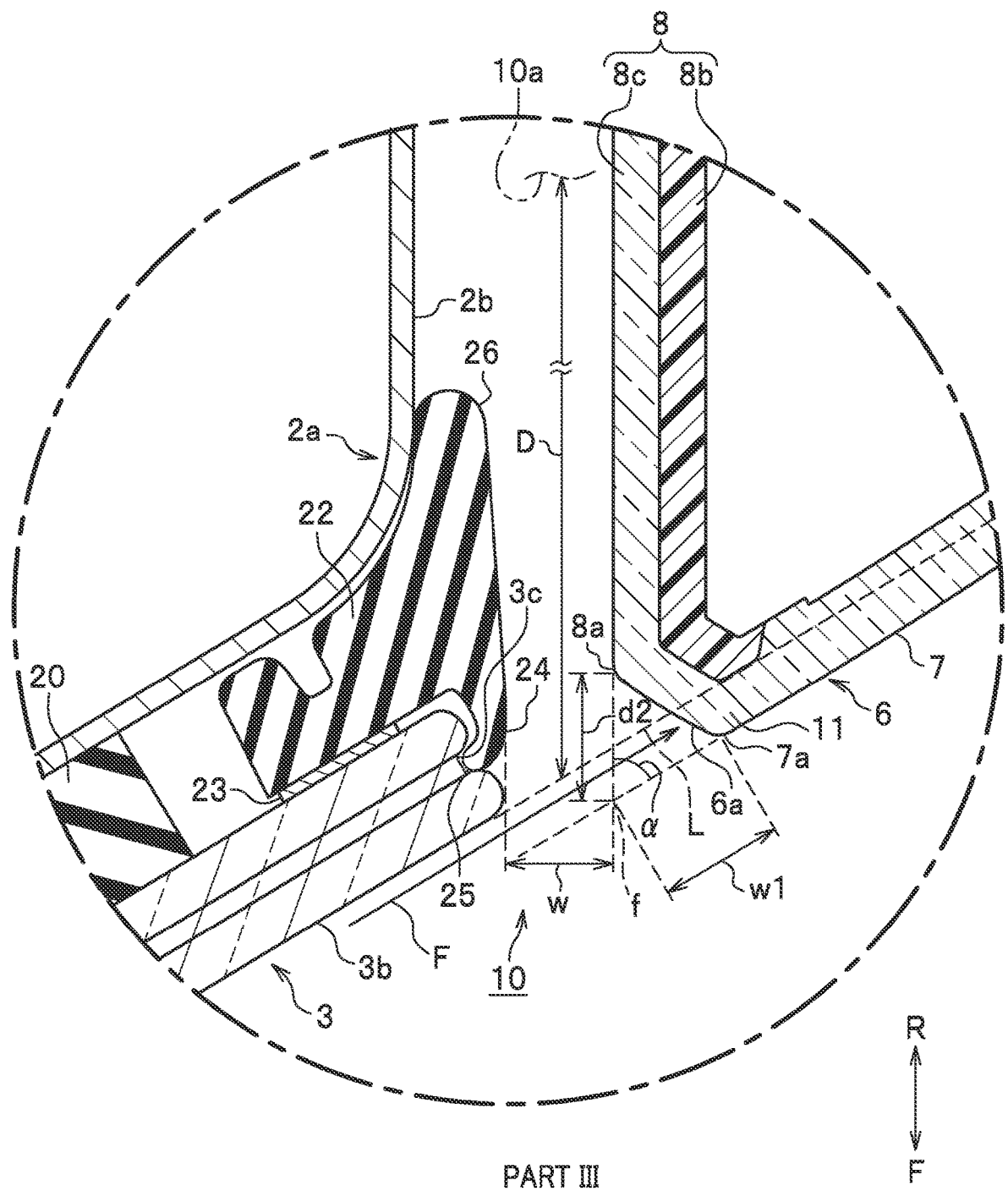
FIG. 3 is an enlarged cross-sectional view of the front vehicle body structure in the embodiment at the part III in FIG. 2.

As illustrated in FIG. 3, the dimension W in the vehicle width direction is approximately 4 mm. Also, a bottom portion 10a of the gap 10 located on the rear side of the vehicle is formed by a part of an outer-panel outer side surface 9 or of the corner portion 2a provided so as to extend in the shape of a vertical wall.

The gap 10 in this embodiment is formed between a sidewall of a front pillar 2b at the corner portion 2a and a side surface portion 8 of the lighting body unit 4 facing the sidewall in the shape of a groove from an inlet opening portion on the front side of the vehicle body to the bottom portion 10a on the rear side of the vehicle. The gap 10 extends in the front-rear direction of the vehicle from the inlet opening portion on the front side of the vehicle body through the bottom portion 10a on the rear side.

Also, a depth D of the gap 10 from the inlet opening portion to the bottom portion 10a in the front-rear direction of the vehicle is set at 100 mm or more.

Figures 4, 5:
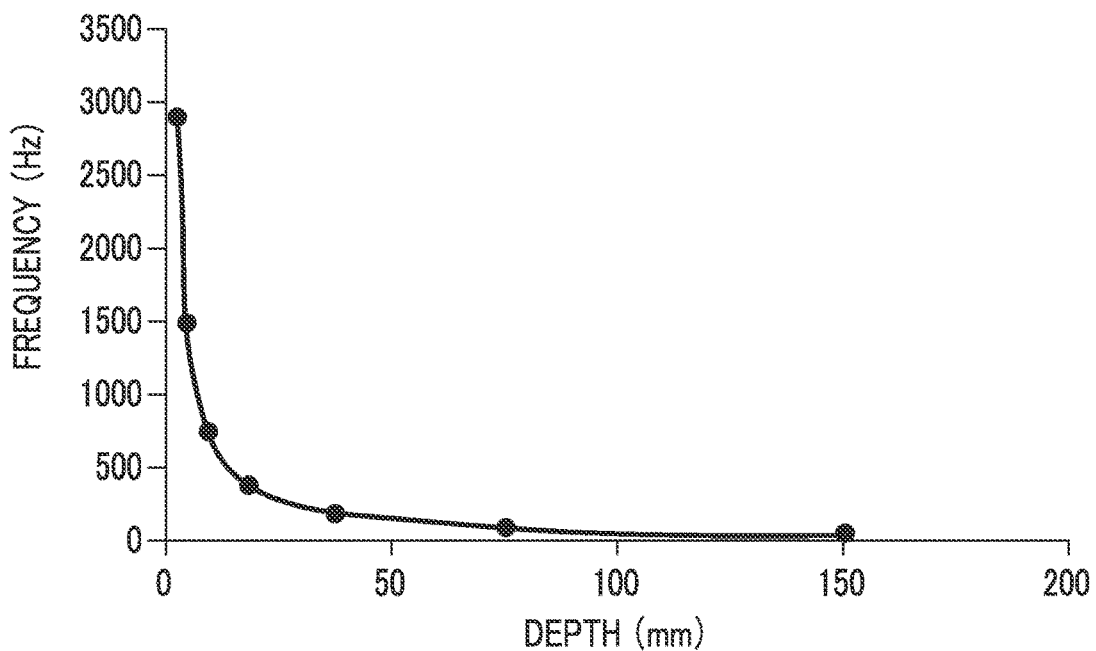
FIG. 4 is a graph illustrating an example of the relation between the depth of a gap and the frequency of generated sound in the front vehicle body structure in the embodiment.
FIG. 5 is a table illustrating the example of the relation between the depth of the gap and the frequency of the generated sound in the front vehicle body structure in the embodiment.

FIG. 4 is a graph illustrating an example of the relation between the depth D (mm) of the gap 10 and the frequency (Hz) of generated sound. FIG. 5 is a table illustrating the example of the relation between the depth D (mm) of the gap and the frequency (Hz) of the generated sound.

As the depth D becomes smaller, the frequency of the generated sound shifts to a higher frequency, which makes the generated sound more recognizable as abnormal sound.

Meanwhile, it has been known that the effect of the size of the dimension W of the gap 10 in the vehicle width direction on the generated sound is usually low.

For this reason, the depth D is set to be sufficiently larger than the dimension W of the gap 10 in the vehicle width direction (D>W) and is desirably at least 35 mm in order to prevent generation of high-frequency noise.

The outer lens 6 is supported at a desired position by being engaged with a resin housing not illustrated that is mounted to the front part 2. As illustrated in FIG. 3, the outer lens 6 in this embodiment has a front surface portion 7 facing the front side of the vehicle, and the side surface portion 8 extending toward the rear side of the vehicle from a windshield-side end 7a of the front surface portion 7. The outer lens 6 is formed by two-color molding using a transparent resin material for the front surface portion 7 and a transparent resin material 8c and a resin material 8b colored in black for the side surface portion 8.

Of these portions, the front surface portion 7 is formed so as to be inclined rearward at substantially the same angle as the windshield 3. On the other hand, the side surface portion 8 is disposed such that its surface extends in directions substantially along the front-rear direction and the up-down direction of the vehicle.

The outer lens 6 in this embodiment is such that the front surface portion 7 and the side surface portion 8 abut each other in a continuous manner at a predetermined angle α (α=approximately 60 degrees in this embodiment) at an outside corner portion 11 formed by the front surface portion 7 and the side surface portion 8. The outer lens 6 in this embodiment is formed by molding the front surface portion 7 and the side surface portion 8 integrally with each other. The outside corner portion 11 is a chamfered portion 6a chamfered such that a length w1 along the front surface portion 7 from a windshield-side end 7a of the front surface portion 7 to a fictitious vertex f at which an extension line from the front surface portion 7 and an extension line from the side surface portion 8 intersect each other is in a range of 3 mm or less, and a length dl along the side surface portion 8 from a front end 8a of the side surface portion 8 to the fictitious vertex f, at which the extension line from the front surface portion 7 and the extension line from the side surface portion 8 intersect each other, is in a range of 5 mm or less.

Also, the front surface portion 7 is curved toward the rear side as it extends outward in the vehicle width direction. Thus, a rear edge portion 6b (see FIG. 1) of the outer lens 6 is formed to be continuous with the outer-panel outer side surface 9 such that its inclination angle is set at a predetermined inclination angle, e.g., approximately 5 degrees, to the outer-panel outer side surface 9.

Moreover, at the outside corner portion 11 of the outer lens 6, the flat chamfered portion 6a, which is at a predetermined inclination angle to the front-rear direction of the vehicle, is provided across the substantially entire region of the outside corner portion 11 in the up-down direction. The chamfered portion 6a is connected to each of the front surface portion 7 and the side surface portion 8 at substantially the same angle.

As illustrated in FIG. 3, at least part of the chamfered portion 6a is provided so as to protrude toward the front side of the vehicle from a fictitious line L drawn along a surface 3b of the windshield 3 to the outer lens 6.

As illustrated in FIG. 2, the windshield 3 is supported on each of the left and right front pillars 2b and 2b of the vehicle body 1 via a rubber seal member 20, a molding member 22, and seal tape 23 (see FIG. 3). The molding member 22 is integrally provided with a lip portion 24.

The lip portion 24 has its tip 25 locked in a groove portion 3c formed in the end surface 3a of the windshield 3. In this way, the lip portion 24 is provided so as to be spaced from the outer lens 6 by the predetermined dimension W (see FIG. 3) in the width direction.

On the molding member 22, a rear lip portion 26 is formed facing rearward on the opposite side from the lip portion 24. The inner side surface of the rear lip portion 26 is curved and bonded to the outer side surface of a corner of the front pillar 2b.

As described above, the front vehicle body structure in this embodiment includes the windshield 3 and the lighting body units 4 and 4 provided beside and along the end surfaces 3a and 3a of the windshield 3 in the vehicle width direction. Each lighting body unit 4 has the lighting body 5 and the outer lens 6, which is disposed along the end surface 3a of the windshield 3 and transmits light from the lighting body 5.

The gap 10 is provided between the windshield 3 and the outer lens 6. The outer lens 6 has the front surface portion 7 facing the front side of the vehicle, and the side surface portion 8 extending toward the rear side of the vehicle from the windshield-side end 7a of the front surface portion 7. The chamfered portion 6a is provided at the outside corner portion 11 formed by the front surface portion 7 and the side surface portion 8.

The front vehicle body structure in this embodiment thus configured can reduce wind noise.

Specifically, an airflow F flowing outward in the vehicle width direction along the surface 3b of the windshield 3 contacts the chamfered portion 6a provided at the windshield-side end 7a of the outer lens 6. Thus, the airflow F having contacted the chamfered portion 6a becomes a turbulent flow. Accordingly, air vibration that generates noise can be suppressed as compared a case without the chamfered portion 6a.

In this embodiment, the front surface portion 7 and the side surface portion 8 are connected to each other at an acute angle of α=approximately 60 degrees, for example.

Even with such a shape, forming the chamfered portion 6a can suppress air vibration and thus reduce wind noise that may be heard as noise.

The wind noise is reduced even in a case where, for example, the windshield 3 is provided to stand substantially vertically and the lighting body units 4 and 4 are disposed by its side edges as illustrated in FIG. 1. This can increase the degree of freedom in design of each lighting body unit 4 and the windshield 3.

Further, as illustrated in FIG. 3, at least part of the chamfered portion 6a is provided so as to protrude toward the front side of the vehicle from the fictitious line L drawn along the surface 3b of the windshield 3 to the outer lens 6.

Thus, the airflow F flowing along the surface 3b of the windshield 3 contacts the chamfered portion 6a, at least part of which protrudes, from the front side. Air vibration that generates noise can be suppressed as compared the case without the chamfered portion 6a.

Also, as illustrated in FIG. 3, the depth D of the gap 10 in the front-rear direction of the vehicle is larger than the dimension W of the gap 10 in the vehicle width direction (D>W).

Thus, high-frequency wind noise that may be heard as noise can be reduced to a greater extent in a case where the gap 10 is deep than in a case where the gap 10 is shallow.

Further, the gap 10 in this embodiment is formed so as to extend in the front-rear direction of the vehicle through a space between a left or right sidewall of the corner portion 2a and the side surface portion 8 of the lighting body unit 4 facing the sidewall from the inlet opening portion to the bottom portion 10a. This makes it possible to set the gap 10 as a deep gap and thus reduce wind noise that may be heard as noise.

Furthermore, as illustrated in FIG. 3, the front vehicle body structure in this embodiment is provided with the lip portion 24 of the molding member 22, which supports the windshield 3 on the front pillar 2b located at the corner portion of the vehicle body 1. The lip portion 24 is provided so as to be spaced from the outer lens 6 by the dimension W in the width direction.

This makes it possible to make the gap 10 deeper and thus further reduce wind noise.

In this embodiment, as illustrated in FIG. 3, the outer lens 6 is present near the left or right end surface 3a of the windshield 3 but the airflow F from the surface 3b of the windshield 3 contacts the chamfered portion 6a, so that wind noise is reduced. This makes it possible to provide the lighting body unit 4 beside and along the left or right end surface 3a of the windshield 3 in an integral manner. Accordingly, practically advantageous effects such as improvement in the degree of freedom in design are achieved.

The present invention is not limited to the above-described embodiment, and various changes can be made. The above-described embodiment has been exemplarily presented in order to describe the present invention comprehensibly, and is not necessarily limited to an embodiment including all configurations described. Also, part of a configuration in one embodiment can be replaced with a configuration in another embodiment, and a configuration in one embodiment can be added to a configuration in another embodiment as well. Also, part of a configuration in each embodiment can be removed or replaced with another configuration or another configuration can be added. The above-described embodiment can be changed as below, for example.

In this embodiment, the chamfered portion 6a of the outer lens 6 is provided at the outside corner portion 11, at which the front surface portion 7 and the side surface portion 8 are joined to each other at the predetermined angle α=approximately 60 degrees. However, the chamfered portion 6a is not limited to this. For example, the chamfered portion 6a may be provided at an outside corner portion 11 at which the front surface portion 7 and the side surface portion 8 abut each other at another angle α. In other words, the chamfered portion 6a is not limited in position, angle, shape, number, or material as long as the chamfered portion 6a is provided at the outside corner portion 11 formed by the front surface portion 7 and the side surface portion 8.

Also, the chamfered portion 6a provided at the outside corner portion 11 is not limited to a flat portion having a predetermined inclination angle to the front-rear direction of the vehicle as in this embodiment. For example, the chamfered portion 6a may have a shape curved in a wavy form outward in its in-plane direction or the like, or one or a plurality of chamfered portions 6a may be provided at part of the outside corner portion 11. In other words, the shape of the chamfered portion 6a provided at the outside corner portion 11 formed by the front surface portion 7 and the side surface portion 8 is not particularly limited.

Further, the outer lens 6 in this embodiment is formed by two-color molding using transparent resin materials and a resin material colored in black. However, the outer lens 6 is not limited to this. An embossed translucent lens and/or a resin material colored in a color other than black can be used as appropriate. Also, a rear part of the side surface portion 8 from the part where the chamfered portion 6a is formed can be replaced with another member such as a housing instead of the outer lens 6.

What is claimed is:

1. A front vehicle body structure of a vehicle, comprising:
   a windshield, wherein the windshield is a front glass disposed at a front side of the vehicle in a front-rear direction of the vehicle; and
   a lighting body unit provided beside and along an end surface of the windshield in a width direction of the vehicle,
   wherein the lighting body unit has a lighting body and an outer lens that is disposed along the end surface of the windshield and transmits light from the lighting body,
   a gap is provided between the windshield and the outer lens,
   the outer lens has a front surface portion facing frontward in the front-rear direction of the vehicle, and a side surface portion extending toward a rear side of the vehicle in the front-rear direction of the vehicle from an end of the front surface portion on the windshield side, and
   a chamfered portion is provided at an outside corner portion formed by the front surface portion and the side surface portion, and a front side surface of the chamfered portion faces toward the gap.

2. The front vehicle body structure according to claim 1, wherein at least part of the chamfered portion is provided so as to protrude toward the front side of the vehicle from a fictitious line drawn along a surface of the windshield to the outer lens.

3. The front vehicle body structure according to claim 1, wherein a depth of the gap in the front-rear direction of the vehicle is larger than a width of the gap in the width direction of the vehicle.

4. The front vehicle body structure according to claim 1, further comprising a lip portion supporting the windshield on a vehicle body,
   wherein the lip portion is provided so as to be spaced from the outer lens.

5. The front vehicle body structure according to claim 1, wherein a length along the front surface portion from a windshield-side end of the front surface portion to a fictitious vertex at which an extension line from the front surface portion and an extension line from the side surface portion intersect each other is 3 mm or less, and a length along the side surface portion from a front end of the side surface portion to the fictitious vertex is 5 mm or less.

6. The front vehicle body structure according to claim 1, wherein the chamfered portion is connected to each of the front surface portion and the side surface portion at a substantially same angle.

7. The front vehicle body structure according to claim 1, wherein the side surface portion extends substantially in parallel to the gap in the front-rear direction of the vehicle.

* * * * *